(12) United States Patent
Browne et al.

(10) Patent No.: US 8,096,537 B2
(45) Date of Patent: Jan. 17, 2012

(54) ACTIVE MATERIAL BASED SUCTION CUPS

(75) Inventors: Alan L. Browne, Grosse Pointe, MI (US); Nancy L. Johnson, Northville, MI (US); Robin Stevenson, Bloomfield, MI (US); Nilesh D. Mankame, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1116 days.

(21) Appl. No.: 11/536,009

(22) Filed: Sep. 28, 2006

(65) Prior Publication Data

US 2008/0078896 A1  Apr. 3, 2008

(51) Int. Cl.
*B25B 11/00* (2006.01)
(52) U.S. Cl. ............ 269/21; 248/205.5; 248/205.7; 248/206.2; 248/262; 248/363; 254/96 HP
(58) Field of Classification Search ............ 248/205.5, 248/205.7, 206.2, 262, 363; 428/99, 900; 269/21; 254/96 HP
See application file for complete search history.

(56) References Cited

U.S. PATENT DOCUMENTS

| | | | | | |
|---|---|---|---|---|---|
| 904,650 | A | * | 11/1908 | Sampson | 15/110 |
| 963,060 | A | * | 7/1910 | Noppel | 4/255.02 |
| 1,298,139 | A | * | 3/1919 | Wolcott | 248/206.2 |
| 1,426,930 | A | * | 8/1922 | Waldron | 294/64.1 |
| 1,842,383 | A | * | 1/1932 | Bell | 248/206.2 |
| 2,278,075 | A | * | 3/1942 | Hecht | 248/205.5 |
| 2,557,434 | A | * | 6/1951 | Hoverder | 248/544 |
| 2,871,615 | A | * | 2/1959 | Borah | 248/346.11 |
| 2,910,264 | A | * | 10/1959 | Lindenberger | 248/362 |
| 2,936,139 | A | * | 5/1960 | Lindstrom | 248/616 |
| 2,940,720 | A | * | 6/1960 | Birr | 248/309.3 |
| 2,968,995 | A | * | 1/1961 | Holden | 248/467 |
| 3,365,161 | A | * | 1/1968 | Deitch | 248/317 |
| 3,377,096 | A | * | 4/1968 | Wood | 294/64.1 |
| 3,514,065 | A | * | 5/1970 | Donaldson | 248/363 |
| 4,196,882 | A | * | 4/1980 | Rognon | 248/205.9 |
| 4,356,989 | A | * | 11/1982 | Ireland | 248/205.9 |
| 4,421,288 | A | * | 12/1983 | Blaszkowski | 248/205.4 |
| 4,718,629 | A | * | 1/1988 | Block et al. | 248/363 |
| 5,631,426 | A | * | 5/1997 | Jao | 73/644 |
| 5,964,437 | A | * | 10/1999 | Belokin et al. | 248/205.5 |
| 6,053,464 | A | * | 4/2000 | Cardarelli | 248/205.8 |
| 6,143,391 | A | * | 11/2000 | Barnes et al. | 428/99 |
| 6,405,983 | B1 | * | 6/2002 | Goj | 248/205.1 |
| 6,437,560 | B1 | * | 8/2002 | Kalb | 324/207.13 |
| 6,588,718 | B2 | * | 7/2003 | Kalb | 248/205.5 |
| 6,749,160 | B1 | * | 6/2004 | Richter | 248/206.2 |
| 6,856,761 | B2 | * | 2/2005 | Doran | 392/406 |
| 7,226,026 | B2 | * | 6/2007 | Lin | 248/205.5 |
| 7,296,979 | B2 | * | 11/2007 | Raab et al. | 417/151 |

* cited by examiner

*Primary Examiner* — Terrell McKinnon
*Assistant Examiner* — Michael McDuffie
(74) *Attorney, Agent, or Firm* — Cantor Colburn LLP

(57) ABSTRACT

Remotely engageable and releasable suction cups include a pliable body and an active material in operative communication with the pliable body and configured to create and/or eliminate a partial vacuum through the activation of stiffness or geometry changes in the active material. Suitable active materials include shape memory materials such as shape memory alloys, ferromagnetic shape memory alloys, and shape memory polymers (SMP). A second class of active materials include materials that exhibit a change in at least one attribute when subjected to an applied field but revert back to their original state upon removal of the applied field. Active materials in this category include piezoelectric materials, electroactive polymers (EAP), magnetorheological polymers, and the like.

19 Claims, 5 Drawing Sheets

OPEN    CLOSED

ACTIVE MATERIAL BASED SUCTION CUPS

BACKGROUND

The present disclosure generally relates to remotely engageable and releasable suction cups, and more particularly, to active material based suction cups wherein an active material is configured to effect engagement/release of the suction cup upon activation thereof.

Suction cups are well known in the art and widely used to enable fixtures to be attached to smooth surfaces. A typical suction cup includes a concave pliable body that defines a cavity. When external pressure is applied to the suction cup and it is pressed against a surface, the deformation of the suction cup reduces the volume of the cavity and simultaneously forms a seal between the lip of the suction cup and the surface. Upon release of the pressure, the suction cup attempts to recover to its initial underformed state. In so doing, the volume of the internal cavity increases, thereby creating an at least partial vacuum in the cavity. The difference in pressure between the externally applied atmospheric pressure and the reduced pressure within the cavity results in a net pressure applied to the suction cup, which enables it to hold its position and also to support additional applied loads imposed on it. Suction cups are versatile and do not leave holes or residue on the original surface after their removal, unlike conventional wall nails, adhesive fasteners, and the like.

Prior art suction cups generally require manual removal of the partial to full vacuum, i.e., a compromise of the seal integrity, to selectively remove the suction cup from its attached surface. It would be desirable to have a suction cup that can be remotely engaged and disengaged.

BRIEF SUMMARY

Disclosed herein are remotely engageable and releasable suction cups. In one embodiment, the active material based suction cup comprises a pliable body configured to create a vacuum when pressed against a mounting surface; and an active material in operative communication with the pliable body, the active material being operative to change at least one attribute in response to an activation signal, wherein pressure within the pliable body changes with the change in the at least one attribute of the active material.

In another embodiment, the active material based suction cup comprises a pliable body configured to create a vacuum within a cavity when pressed against a mounting surface; at least one channel disposed about a periphery of the pliable body portion; and an active material configured to selectively cinch or expand a portion of the channel, wherein pressure within the cavity and/or spatial distribution of the pressure at an interface between the body and the mounting surface changes.

A process for remotely engaging and disengaging and active material based suction cup comprises compressing the active material based suction cup against a mounting surface to create a pressure differential between a cavity in the suction cup and an environmental pressure external to the cavity so as to create a seal between the suction cup and the mounting surface and maintain the pressure differential, wherein the active material based suction cup comprises a pliable body and an active material in operative communication with the pliable body, the active material being operative to change at least one attribute in response to an activation signal, wherein pressure differential within the pliable body changes with the change in the at least one attribute of the active material; and activating the active material to selectively increase or decrease the pressure differential and/or change a spatial distribution at an interface between the body and the mounting surface.

The above described and other features are exemplified by the following figures and detailed description.

BRIEF DESCRIPTION OF DRAWINGS

Referring now to the figures, which are exemplary embodiments and wherein the like elements are numbered alike.

DETAILED DESCRIPTION

Figure 1:
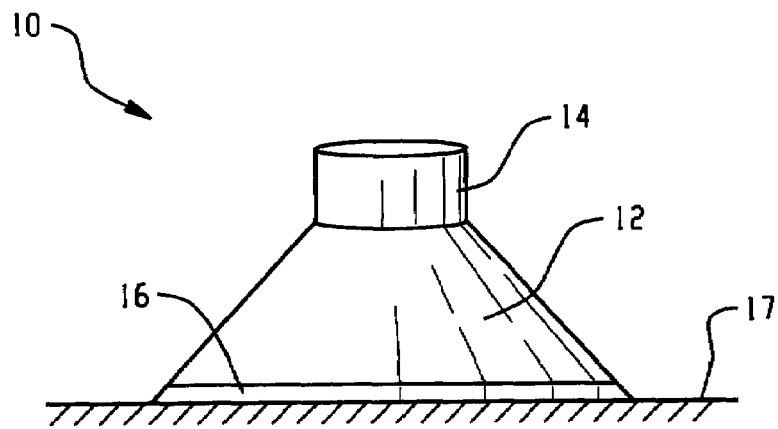
FIG. 1 illustrates a perspective view of an active material based suction cup in accordance with one embodiment.

In FIG. 1, there is shown a flat type suction cup generally illustrated by reference numeral 10. The suction cup 10 includes an engaging member 12 (i.e., a diaphragm-like member) comprised of a concave pliable body adapted for engaging surface 17 and is optionally molded onto one end of a neck 14. The neck 14 or a portion of the engaging member 12 further includes means for attachment to another object or may be integrated with the object. The flexible concave surface further includes an active material 16 configured to create, modulate, and/or eliminate a partial or full vacuum through the activation of stiffness, modulus, or geometry changes in the active material. Through local or remote activation of these stiffness or geometry changes in the active material, the suction cup 10 can be engaged and disengaged. Depending on the location, type, and configuration of the active material, activation can be used to create, modulate, and/or remove a vacuum resulting from the interaction between the pliable body and its internal cavity. Depending on the design of the suction cup and the manner in which the active materials interact with the rest of the cup, either activation or de-activation of the active materials may be used for engagement or disengagement. Further, more than one set of active materials may be employed, such that some sets induce engagement while the rest aid in disengagement. For example, as shown in FIG. 1, the active material 16 can be disposed in close proximity or may define the surface of the engaging member that contacts the surface to be engaged/ disengaged. Activation of the active material can be used to create or break a sealing engagement of the engaging member to the surface 17. Alternatively, the entire suction cup can be formed of the active material.

As will be described in greater detail herein, the active material can be used to change the geometry of the engaging member through local or global modifications. In embodiments where the active material does not form the suction cup in its entirety, the engaging member body is typically formed of an elastomer. Various elastomers are well known to those in the art. For use as a suction cup, the elastomer is preferably selected to have a Shore A hardness of about 30 to about 80.

The term "active material" as used herein refers to several different classes of materials all of which exhibit a change in at least one attribute such as crystal structure, morphology, and/or elastic modulus when subjected to at least one of many different types of applied activation signals, examples of such signals being thermal, radiation, moisture, electrical, magnetic, stress, vibration, and the like. One class of active materials is shape memory materials. These exhibit a shape memory. Specifically, after being deformed pseudoplastically, they can be restored to their original shape by the application of the appropriate field. In this manner, shape memory materials can change to a determined shape in response to an activation signal. Suitable shape memory materials include, without limitation, shape memory alloys (SMA), ferromagnetic SMAs (FSMA), and shape memory polymers (SMP). A second class of active materials can be considered as those that exhibit a change in at least one attribute when subjected to an applied field but revert back to their original state upon removal of the applied field. Active materials in this category include, but are not limited to, piezoelectric materials, electroactive polymers (EAP), magnetostrictive elastomers, magnetorheological polymers, and the like. Depending on the particular active material, the activation signal can take the form of, without limitation, an electric current, a temperature change, moisture, light, a magnetic field, a mechanical loading or stressing, and the like.

Shape memory polymers may be thermo-responsive (i.e., the change in the property is caused by a thermal activation signal), photo-responsive (i.e., the change in the property is caused by a light-based activation signal), moisture-responsive (i.e., the change in the property is caused by a liquid activation signal such as humidity, water vapor, or water), chemo-responsive (i.e., responsive to change in the chemical environment, e.g., pH) or a combination comprising at least one of the foregoing. Shape memory polymers, as long as there is a lip of flexible non-SMP material at the contact interface, are especially suitable for forming the cup body since they can undergo relatively high reversible strains (100-300%), which thus allows the suction cup to conform to a wide range of geometries, e.g., flat, convex, concave, and the like, as well as sizes, e.g., surface features on the order of a few nanometers in height and/or extent to those on the order of 10 centimeters or more.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be shaped. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes. It is also noted that other stimuli can be used depending on the SMP composition as previously noted, e.g., photostimulated, moisture stimulated, and the like. For convenience, discussion herein will focus on thermal activation, however, those skilled in the art will appreciate that other stimuli can produce similar results and are intended to be included within scope of this disclosure.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent from the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about −30° C. Another temperature for shape recovery may be greater than or equal to about 20° C. Another temperature for shape recovery may be greater than or equal to about 70° C. Another temperature for shape recovery may be less than or equal to about 250° C. Yet another temperature for shape recovery may be less than or equal to about 200° C. Finally, another temperature for shape recovery may be less than or equal to about 180° C.

Suitable polymers for use in the SMPs include thermoplastics, thermosets, interpenetrating networks, semi-interpenetrating networks, or mixed networks of polymers. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsesquioxane), polyvinyl chloride, urethane/butadiene copolymers, polyurethane block copolymers, styrene-butadiene-styrene block copolymers, and the like, and combinations comprising at least one of the foregoing polymer components. Examples of suitable polyacrylates include poly(methyl methacrylate), poly(ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). The polymer(s) used to form the various segments in the SMPs described above are either commercially available or can be synthesized using routine chemistry. Those of skill in the art can readily prepare the polymers using known chemistry and processing techniques without undue experimentation.

Similar to shape memory polymers, shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example. These types of materials are well suited for forming the lip region that provides a sealing engagement with a surface.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Suitable piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinylchloride) ("PVC"), polyvinylidene chloride ("PVC2"), and their derivatives; polyacrylonitriles ("PAN"), and their derivatives; polycarboxylic acids, including poly (metharcylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly (N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, T, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, $AgCaSe_2$, ZnSe, GaP, InP, ZnS and mixtures thereof.

Although reference has been made to bimorphs formed of piezoelectrics, it should be apparent to those skilled in the art that other materials can be used to provide similar behavior. For example, ionic polymer actuators such as ionic polymer metal composite and conductive polymers intrinsically exhibit this effect due to the transport of ionic species that cause swelling across a membrane.

The use of the above noted active materials provides the engaging member with an adjustable modulus. When deforming the suction cup to make it conform to the surface to be grasped, the active material, in one embodiment, is switched to its lower modulus form, e.g. the modulus of an SMP based material can be switched by a factor of 30 by heating the SMP portion to a temperature greater than its switching temperature (e.g., glass transition temperature, melt temperature, and the like depending on the SMP composition). This allows the engaging member to deform more easily than the same material in its low temperature state, thereby allowing the suction cup to dispel more fluid (e.g., air, liquid, other gases, and the like that are compatible with the materials used to form the suction cup as well as compatible with the particular activation signal employed) from under its body to form an airtight seal with the surface of interest. Since the change in modulus is providing the flexibility for creating a good airtight seal, the cross section of different parts of the cup need not be very thin. This property can be used in some suction cup configurations to provide improved mechanical strength as well as increased operating lifetimes.

Figure 2:
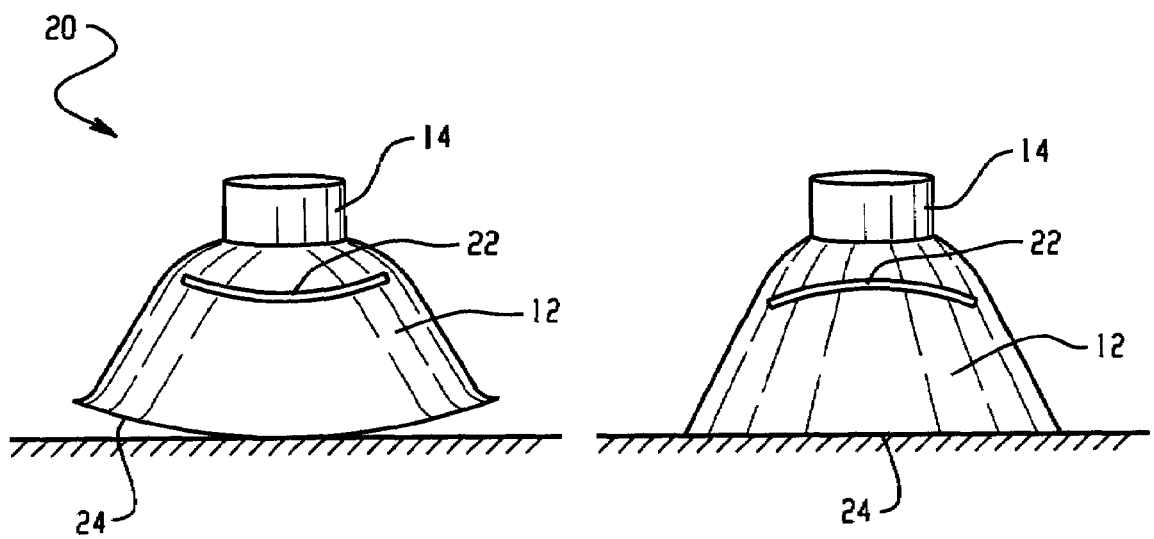
FIG. 2 illustrates a perspective view of an active material based suction cup upon release and engagement in accordance with another embodiment.

FIG. 2 illustrates an active material based suction cup 20 that includes a piezoelectric material 22 that is configured to lift the perimeter seal 24 of the suction cup so as to selectively release the vacuum and/or to lift the center section of the cup to create a partial vacuum under the cup so as to provide engagement. It should be apparent that for disengagement the change in profile has to equalize the pressures on either side of the suction cup body by producing a leak between the suction cup and the mounting surface or by decreasing the internal cavity volume provided by the suction cup. For example, a piezoelectric patch can be disposed within or in contact with the central portion of the suction cup. The piezoelectric material can be unimorph or bimorph. A unimorph actuator, one containing a single layer of piezoelectric material, is driven to produce a bending actuator (bending in one direction only). In contrast, a bimorph actuator, which contains two layers of piezoelectric material sandwiched around a central layer, depending on how it is driven, may act as a bending actuator in either or both of two opposing directions. Moreover, the piezoelectric can be directionally activated so as to provide engagement or release. Selective activation of the two piezoelectric material layers in a bimorph actuator can provide disengagement by assuming a convex shape relative to the concave surface of the suction cup or a concave shape to effect engagement. Alternatively, the piezoelectric material as a unimorph can be disposed at about a periphery of the suction cup, i.e., at about the portion that contacts the object surface for attachment. In this manner, activation of the piezoelectric can be made to break the seal between an engaged suction sup and the object surface, thereby providing disengagement. It should be apparent to one skilled in the art that no external mechanical force need be applied. However, a mechanical force could be applied to either seal the periphery of the suction cup to the engaging surface or to both seal and expel air to create the partial vacuum as may be desired for some applications.

Figure 3:
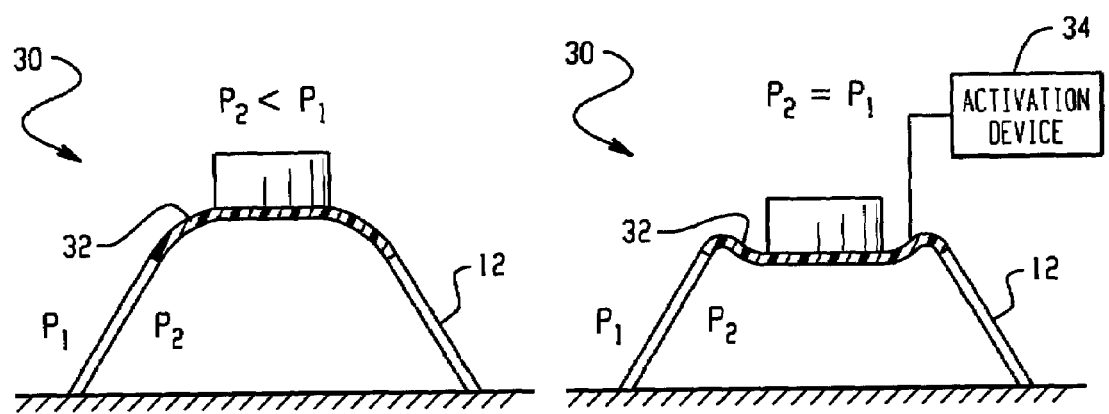
FIG. 3 illustrates a sectional view of an active material based suction cup upon engagement and release in accordance with still another embodiment.

In FIG. 3, an active material based suction cup 30 in accordance with another embodiment is illustrated. At least a central section 32 of the suction cup (or in other embodiments, the entire section) is formed of a shape memory polymer. Activation of the shape memory polymer causes the central portion to collapse due to the pressure differential such that the pressure P1 within the cup is about equal to the atmospheric pressure P2 outside the cup in this manner effecting release/disengagement of the suction cup from the surface. A suitable activation signal can be provided by an activation device 34, which can be a thermal signal, moisture or radiation to selectively activate the shape memory polymer and decrease its elastic modulus in an amount effective to provide the collapse. In this example, the entire disengagement was effected by a single event viz. the drop in modulus of a central section. The disengagement can be effected gradually or in discrete steps if the equalization of pressure was achieved by the drop in modulus of multiple segments. These segments can be activated by heating them individually if they have the same switching temperature; or as a global change in temperature can be prescribed with the effect that only those regions whose switching temperature lies below the global temperature contribute to the change in internal pressure.

Figure 4:
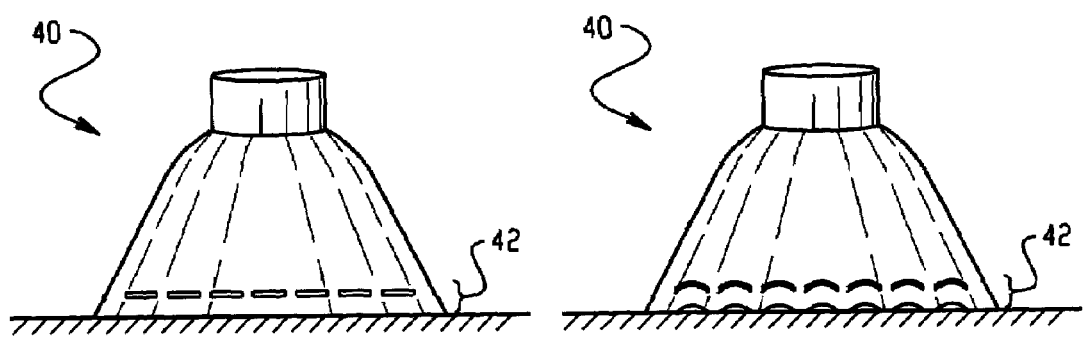
FIG. 4 illustrates a perspective view of an active material based suction cup upon engagement and release in accordance with still another embodiment.

In FIG. 4, a shape memory alloy based suction cup 40 is illustrated that includes shape memory alloy wires or strips at about a periphery 42 of the suction cup. The shape memory alloy wires or strips are embedded about the periphery as flattened (linear) strips (or conversely as curvilinear shapes) but are configured to have a memorized bowed or otherwise non-straight shape (or conversely a straight shape). Thus, upon activation with a suitable activation device, the suction cup will release the vacuum seal and permit disengagement.

Although exemplary embodiments have been illustrated, one of skill in the art will appreciate that numerous other active materials can be used to provide engagement and disengagement. Incorporation of these active materials into the cup configuration is well within the skill of those in the art. For example, the periphery of a suction cup can be formed of an electroactive polymer which when activated can change the suction cup geometry and in this way modulate the pressure differential.

Figure 5:
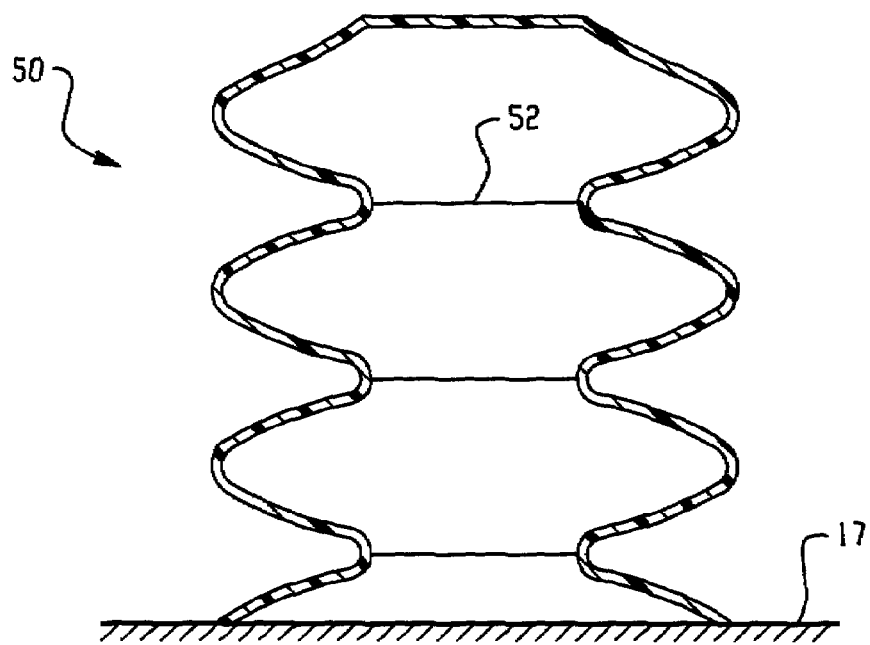
FIG. 5 illustrates a sectional view of a bellows type suction cup with active material based fold lines in accordance with one embodiment.

The suction cups can be used in numerous applications where a releasable attachment based on suction is desirable. For example, the active material based suction cups can be used in grasping parts and positioning clamps/locator blocks and the like in fixturing assemblies, welding, and the like. Moreover, the suction cup is not limited to any particular shape. For example, FIGS. 1-4 generally illustrate what is known in the art as a flat vacuum suction cup. Other configurations are contemplated. For example, as shown in FIG. 5, a bellows type suction cup 50 can be utilized in a manner similar to the flat suction cups discussed above. However, the bellows suction cup provides the added functionality of one or a plurality of panel fold lines 52, which can be formed of the active material in whole or in part.

Figure 6:
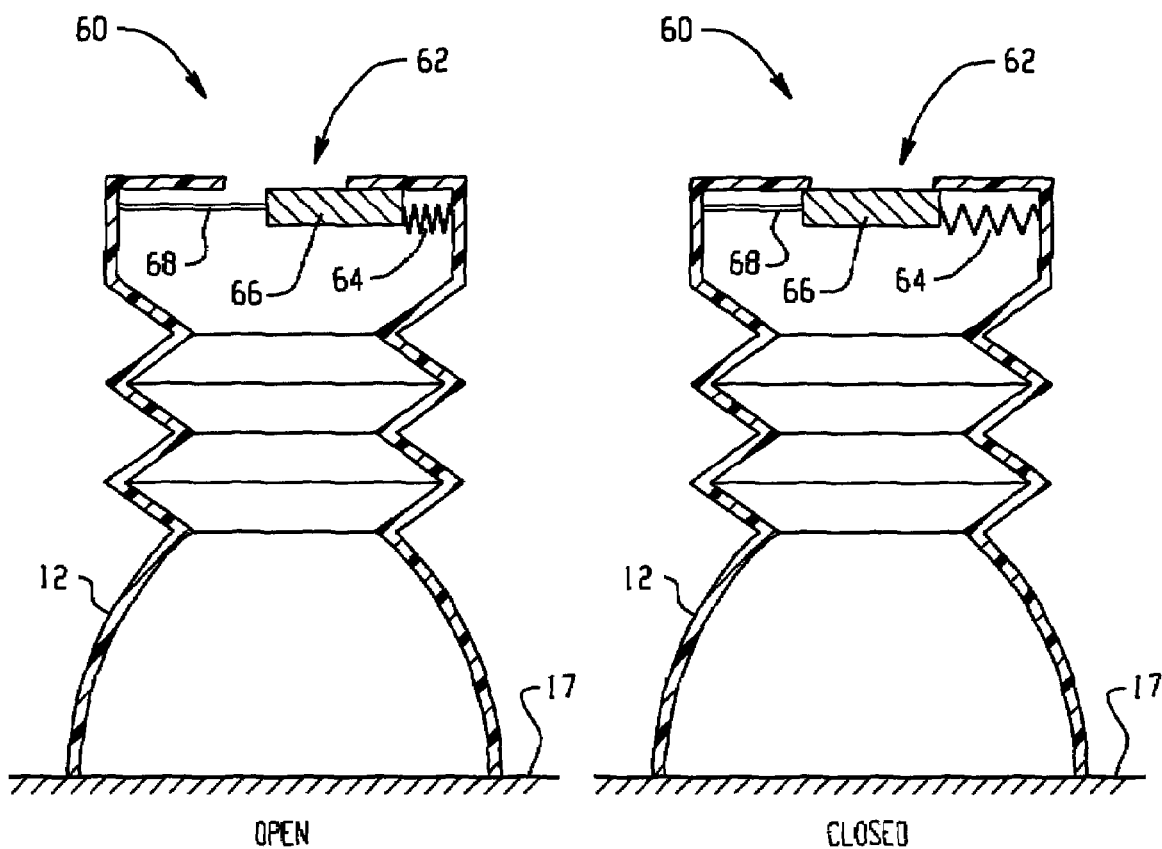
FIG. 6 illustrates a sectional view of a bellows type suction cup including an active material based valve upon release and engagement in accordance with one embodiment.

In FIG. 6, the suction cup 60 includes an active material based valve 62 controlling air pressure within the suction cup-engaging member 12. The valve 62 can include an active material 68 having one end fixedly attached to a sidewall of the suction cup and another end fixedly attached to a slidable panel 66. A bias spring 64 is fixedly attached to the slidable panel 66 in a biased relationship to the active material. Activation of the active material can be used to overcome the bias force associated with the bias spring to effect movement of the slidable panel so as to close the valve. Deactivation of the active material can be used to open the valve. The converse arrangement where activation of the active material closes the valve and deactivation causes the bias spring to open it is another variant. By way of example, the active material can be a shape memory alloy wire or spring, wherein thermal activation causes contraction of the shape memory element.

Figure 7:
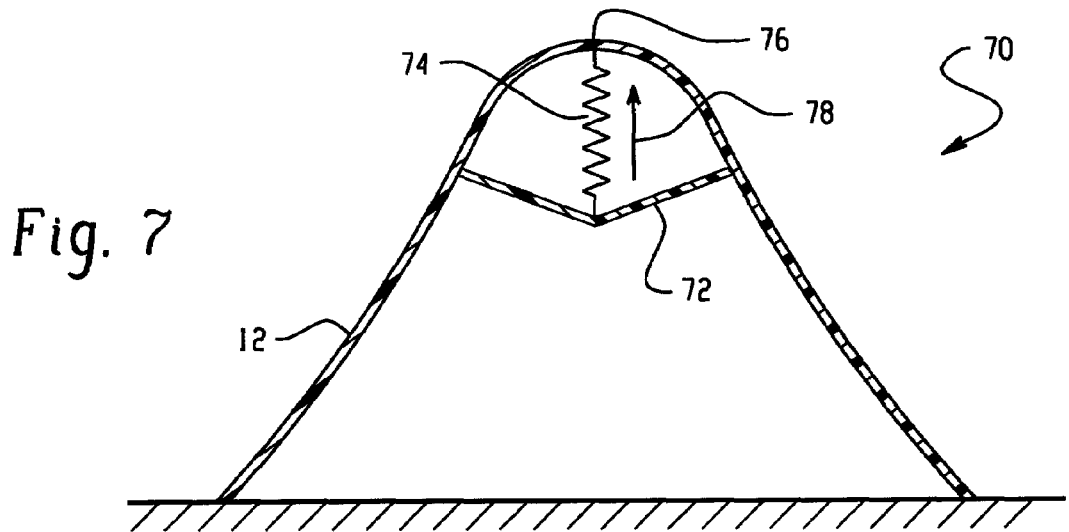
FIG. 7 illustrates a partial sectional view of the engaging member in accordance with one embodiment.
Figure 8:
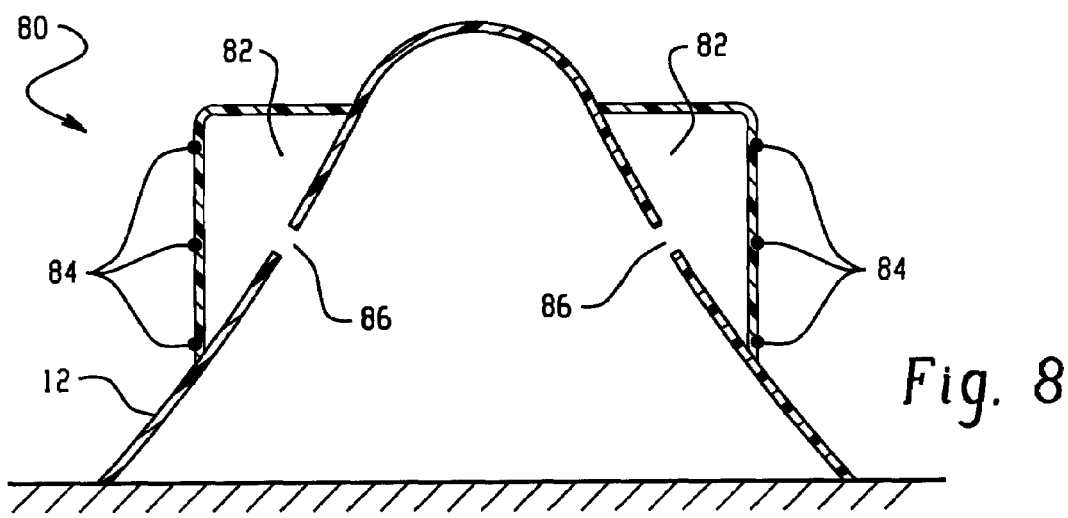
FIG. 8 illustrates a partial sectional view of the engaging member in accordance with another embodiment.
Figure 9:
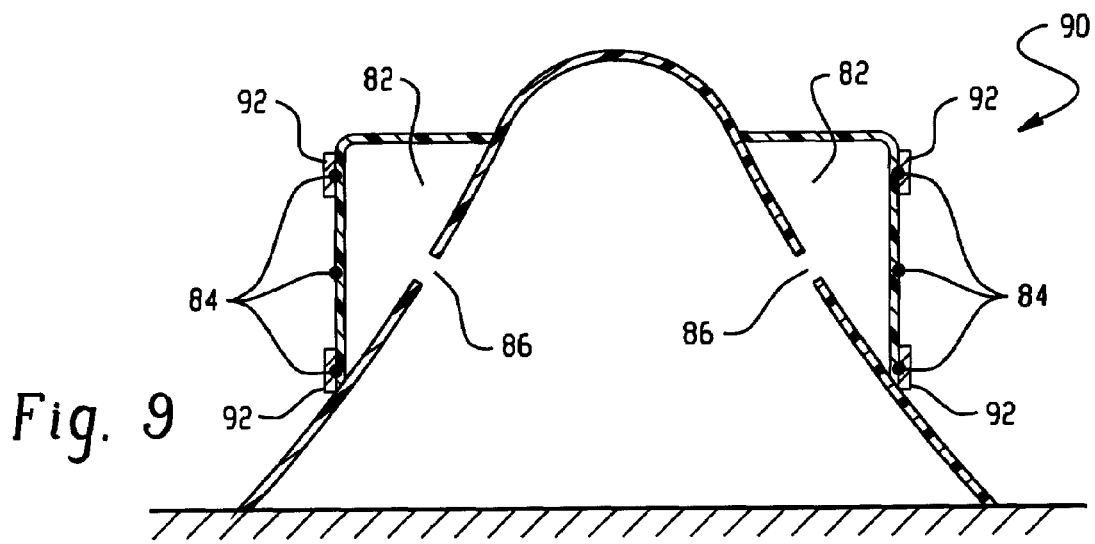
FIG. 9 illustrates a partial sectional view of the engaging member in accordance with still another embodiment.

Other variations are shown in FIGS. 7-9. In FIG. 7, an active material actuator can be employed for creating and removing a vacuum. The suction cup generally illustrated by reference numeral 70 includes a flexible membrane 72 within the concave pliable body 12. An active material based actuator is in operative communication with the membrane such that activation of the active material permits movement of the membrane, thereby providing a means for changing the pressure within the concave pliable body. For example, a shape memory alloy spring 74 can have one end attached at about a neck region 76 of the suction cup and another end attached to the membrane 72. Activation of the shape memory alloy can cause contraction and result in an increase in the volume due to pulling of the membrane in the direction indicated by arrow 78, thereby creating or increasing the degree of vacuum provided by the engaging member 12. The drop in internal pressure created in this way can be sustained either by maintaining activation of element 74 or by using some means to latch the membrane in its deflected position (e.g. by using a bistable membrane). The drop in pressure can be reversed by deactivating element 74 or by unlatching the membrane (e.g. by activating an opposing set of smart materials that cause a bistable membrane to snap back to its original configuration). A variant of this design can be envisioned in which the means of increasing and decreasing the internal vacuum are interchanged.

In FIG. 8, the suction cup 80 can be configured to have an auxiliary chamber 82 in fluid communication with the concave pliable body 12 (i.e., engaging member) via opening 86. An active material 84 can be configured to be in operative communication with the auxiliary chamber 82 such that a change in pressure within the chambers affects the pressure provided by the engaging member 12 of the suction cup. For example, shape memory alloy wires can be circumferentially disposed about the auxiliary chamber 82. The active material can be activated to decrease the volume within the auxiliary chamber 82 prior to engaging the body 12. Once the body is engaged, a further increase in vacuum can be achieved by deactivating the active material and permitting the intrinsic resilience of the material comprising the auxiliary chamber to expand the chamber walls such that it increases the chamber volume and further reduces the pressure.

In FIG. 9, the suction cup 90 is configured to increase the volume within the auxiliary chambers 82. The active material 92 is configured to cause the sidewalls of the auxiliary chamber to bulge out (increase volume) upon activation. For example, portions of the sidewalls can be formed of an electroactive polymer or have axially shape memory alloy wires embedded therein, for example. Activation would thus create or accentuate a vacuum in the suction cup.

Figure 10A:
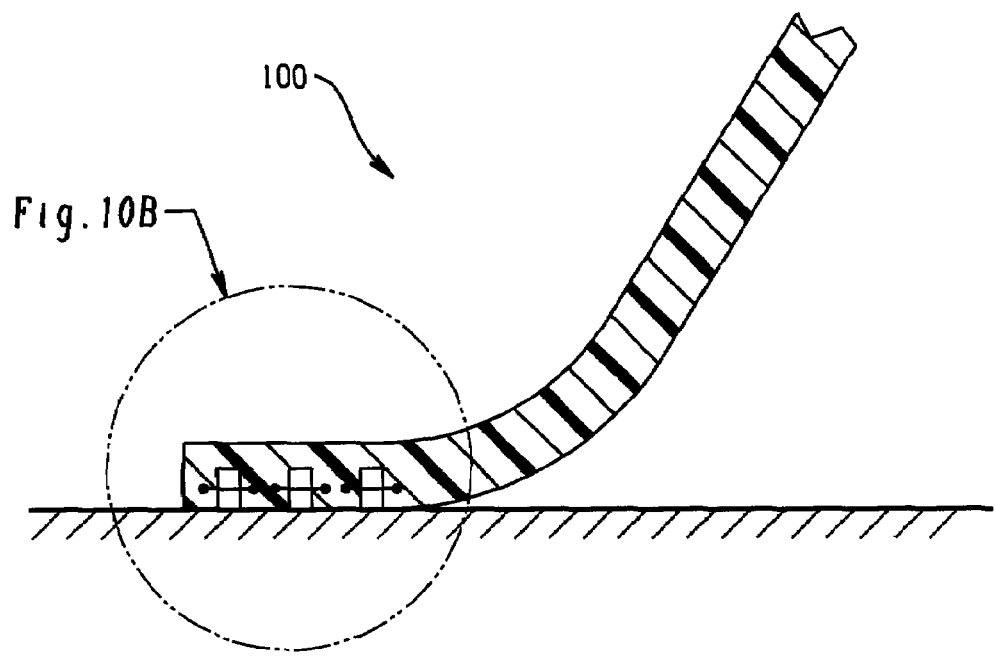
FIGS. 10A and B illustrate a partial sectional views of a suction cup having one or more channels about the periphery in accordance with another embodiment.
Figure 10B:
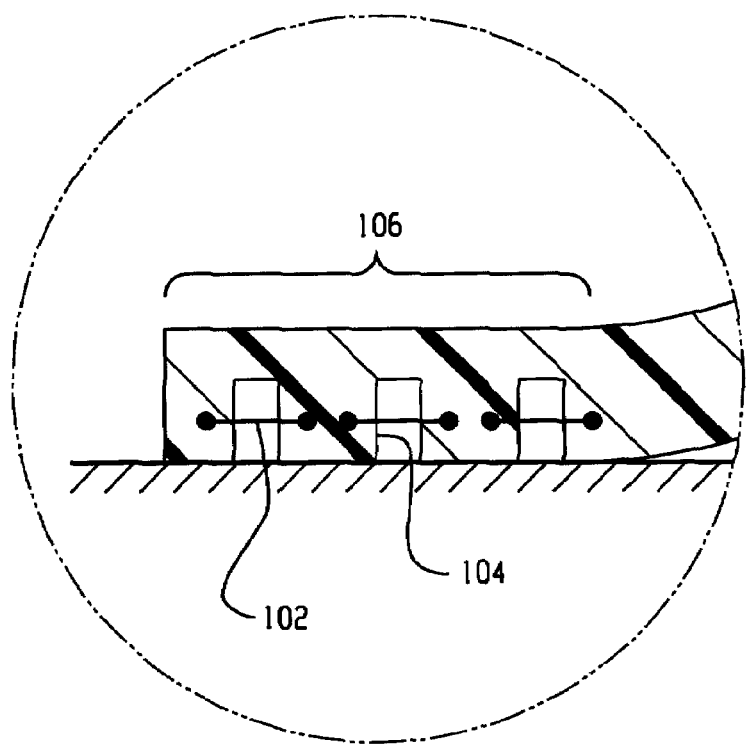

FIGS. 10A and B illustrates yet another embodiment of suction cup 100 having one or more channels 104 disposed about a periphery 106 of the suction cup as shown. An active material 102 traverses the channels 104 periodically or randomly about the periphery 106. The channels can be circumferentially disposed about the periphery as shown, radially disposed, or a combination of circumferentially and radially disposed. The active material 102 can be used to selectively cinch and/or expand opposing sidewalls of the channel, thereby affecting the pressure within the body and/or the spatial distribution of the contact (sealing) pressure between the lip of the pliable body and the mounting surface. In this manner, the activation of the active material can be made to effect release, accentuate the vacuum pressure, or create the vacuum pressure or to control the spatial distribution of the sealing pressure.

Advantageously, also, as used herein, the terms "first", "second", and the like do not denote any order or importance, but rather are used to distinguish one element from another, and the terms "the", "a", and "an" do not denote a limitation of quantity, but rather denote the presence of at least one of the referenced item. Furthermore, all ranges disclosed herein are inclusive of the endpoints and independently combinable.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An active material based suction cup, comprising:
a pliable body configured to create a vacuum when a contact surface of the body is pressed against a mounting surface; and
an active material comprising a shape memory alloy, a shape memory polymer comprising a phase segregated co-polymer that comprises at least two different segments, a ferromagnetic shape memory alloy, an electroactive polymer, a magnetorheological polymer or a piezoelectric material, or a combination thereof, in operative communication with the pliable body, the active material being operative to change at least one attribute in response to an activation signal, wherein pressure within the pliable body changes with the change in the at least one attribute of the active material.

2. The active material based suction cup of claim 1, wherein the pliable body comprises at a least a portion formed of the active material.

3. The active material based suction cup of claim 1, wherein the active material is embedded within the pliable body.

4. The active material based suction cup of claim 1, wherein the active material is disposed about a periphery of the pliable body.

5. The active material based suction cup of claim 1, wherein the active material comprises a plurality of discrete elements of the active material embedded within the pliable body.

6. The active material based suction cup of claim 1, wherein the active material changes shape in response to the activation signal, wherein the change in the shape is effective to release or increase the vacuum within the pliable body.

7. The active material based suction cup of claim 1, wherein the activation signal comprises a thermal activation signal, a magnetic activation signal, a radiation activation signal, an electrical activation signal, a chemical activation signal, a moisture activation signal, a light activation signal, vibration activation signal, or a combination comprising at least one of the foregoing signals.

8. The active material based suction cup of claim 1, further comprising an activation device adapted to provide the activation signal to the active material.

9. The active material based suction cup of claim 1, wherein the active material forms a valve that can be selectively opened and closed upon activation and deactivation of the active material, wherein the valve is in fluid communication with the vacuum provided by the pliable body.

10. The active material based suction cup of claim 1, further comprising an auxiliary chamber in fluid communication with the vacuum provided by the pliable body when pressed against a mounting surface, wherein the active material is in operative communication with the auxiliary chamber to create, accentuate, or discharge the vacuum.

11. The active material based suction cup of claim 1, wherein the mounting surface is not planar.

12. The active material based suction cup of claim 1, wherein the active material is disposed proximate the contact surface.

13. The active material based suction cup of claim 1, wherein the active material comprises the contact surface.

14. An active material based suction cup, comprising:
a pliable body configured to create a vacuum within a cavity when pressed against a mounting surface;
at least one channel disposed about a periphery of the pliable body; and an active material configured to selectively cinch or expand a portion of the channel, wherein pressure within the cavity and/or spatial distribution of the pressure at an interface between the body and the mounting surface changes.

15. The active material based suction cup of claim 14, wherein the at least one channel is radially disposed about the periphery, circumferentially disposed about the periphery, or a combination thereof.

16. The active material based suction cup of claim 14, wherein the active material comprises a shape memory alloy, a shape memory polymer, a ferromagnetic shape memory alloy, an electroactive polymer, a piezoelectric material, a magnetorheological polymer, or combinations comprising at least one of the foregoing materials.

17. A process for remotely engaging and disengaging an active material based suction cup, the process comprising:
compressing the active material based suction cup against a mounting surface to create a pressure differential between a cavity in the suction cup and an environmental pressure external to the cavity so as to create a seal between the suction cup and the mounting surface and maintain the pressure differential, wherein the active material based suction cup comprises a pliable body and an active material in operative communication with the pliable body, the active material comprising a shape memory alloy, a shape memory polymer comprising a phase segregated co-polymer that comprises at least two different segments, a ferromagnetic shape memory alloy, an electroactive polymer, a magnetorheological polymer or a piezoelectric material, or a combination thereof, the active material being operative to change at least one attribute in response to an activation signal, wherein pressure within the pliable body changes with the change in the at least one attribute of the active material; and
activating the active material to selectively increase or decrease the pressure differential.

18. The process of claim 17, wherein activating the active material decreases or increases a modulus property.

19. The process of claim 17, wherein activating the active material changes a shape orientation of the active material.

* * * * *